(12) United States Patent
Tanaka et al.

(10) Patent No.: US 10,203,437 B2
(45) Date of Patent: Feb. 12, 2019

(54) METHOD OF MANUFACTURING A MEMBER, OPTICAL MEMBER AND OPTICAL ELEMENT

(71) Applicant: CANON KABUSHIKI KAISHA, Tokyo (JP)

(72) Inventors: Masato Tanaka, Tokyo (JP); Makoto Kojima, Atsugi (JP); Tomonao Nakayasu, Kawasaki (JP); Yukinobu Okura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/850,849

(22) Filed: Sep. 10, 2015

(65) Prior Publication Data

US 2016/0077250 A1 Mar. 17, 2016

(30) Foreign Application Priority Data

Sep. 12, 2014 (JP) ................. 2014-186855

(51) Int. Cl.
*G02B 5/18* (2006.01)
*B29D 11/00* (2006.01)

(52) U.S. Cl.
CPC ...... *G02B 5/1852* (2013.01); *B29D 11/00269* (2013.01); *B29D 11/00932* (2013.01); *G02B 5/1876* (2013.01)

(58) Field of Classification Search
CPC ........ B29D 11/00269; B29D 11/00769; B29D 11/00317; B29D 11/00326; B29D 11/00336; G02B 3/08

USPC ......... 264/2.5; 369/112.03–112.15; 359/558, 359/566, 567, 569, 570, 571, 574, 575, 359/576, 742, 743

See application file for complete search history.

(56) References Cited

U.S. PATENT DOCUMENTS

| | | | | |
|---|---|---|---|---|
| 2003/0095492 A1* | 5/2003 | Nishino | ............... | G11B 7/1353 369/112.08 |
| 2005/0063281 A1* | 3/2005 | Atarashi | ............. | B29C 45/0013 369/112.03 |
| 2005/0265151 A1* | 12/2005 | Kimura | ................ | G11B 7/1353 369/44.37 |
| 2007/0097492 A1* | 5/2007 | Takasu | ...................... | B23B 1/00 359/362 |
| 2008/0121078 A1* | 5/2008 | Kunimatsu | ............... | B23B 1/00 83/13 |
| 2012/0152080 A1* | 6/2012 | Sukegawa | ............ | G02B 5/1852 83/875 |

(Continued)

FOREIGN PATENT DOCUMENTS

| JP | 11-197902 A | 7/1999 |
|---|---|---|
| JP | 2004-145906 A | 5/2004 |

(Continued)

*Primary Examiner* — Kimberly N. Kakalec
(74) *Attorney, Agent, or Firm* — Canon U.S.A., Inc. IP Division

(57) ABSTRACT

An optical member having a concentric diffraction surface facing the outside, wherein the projection having a inclined surface concentric to the diffraction surface having an angle of inclination θ smaller than the angle of inclination φ is provided outside the diffraction surface having the largest φ, so that an interference of a cutting tool is avoided, and simultaneously, deterioration of a surface roughness may be restrained.

6 Claims, 6 Drawing Sheets

(56) References Cited

U.S. PATENT DOCUMENTS

2012/0229904 A1* 9/2012 Kitamura ............ B29C 33/3842
  359/571

FOREIGN PATENT DOCUMENTS

JP    2008-126391 A   6/2008
WO    2005/006322 A1  1/2005

* cited by examiner

METHOD OF MANUFACTURING A MEMBER, OPTICAL MEMBER AND OPTICAL ELEMENT

BACKGROUND OF THE INVENTION

Field of the Invention

This disclosure relates to a method of manufacturing a member having concentric surfaces including a diffraction optical element or a diffraction optical element forming die used for an optical equipment such as a camera and a video, an optical member having a diffraction grating, and an optical element.

Description of the Related Art

An optical member having a diffraction grating, for example, a diffraction optical element, has characteristics such as having an opposite dispersing property to that of the refraction optical element and contributing to achieve a compact optical system that a refraction optical element including lens and prisms lacks, and hence is used in various optical systems such as optical instruments.

A method of manufacturing an optical member having a diffraction grating is disclosed in Japanese Patent Laid-Open No. 11-197902. Specifically, when forming the shape of a diffraction surface while rotating a diffraction surface to be cut and a cutting tool relatively to each other and translating simultaneously, an inclined surface having a diffracting function is cut by using a side cutting edge having a shorter length than the inclined surface having the diffracting function. Japanese Patent Laid-Open No. 11-197902 also discloses that the cutting tool is attached so that a longitudinal direction of the side cutting edge forms an angle of 30 or smaller with respect to the inclined surface, and the diffraction surface to be cut is relatively moved at an angle of 30 degrees or smaller from a lower side to a higher side of the inclined surface to achieve a cutting process.

Technical Problem

Japanese Patent Laid-Open No. 11-197902 discloses the optical member including a diffraction grating having the same characteristic as a concave lens, specifically, the optical member having a diffraction surface facing inward and an inclination of outer grating and inclined more on the outer side. In a case where this method is applied to an optical member, for example, a plastic lens, by the diffraction grating having the same characteristics as a convex lens (hereinafter, referred to as a projecting grating), there arises the following subject. Here, the optical member on the basis of the projecting grating means a projecting member provided with the diffraction grating having the diffraction surface facing outward and inclined more on the outer side.

In order to process the diffraction surface of the projecting grating from the lower side to the higher side, a distal end of the cutting tool needs to reach the cutting tool to a lowermost point of the diffraction surface of a grating closest to an outer peripheral end portion (hereinafter an outermost grating) while proceeding from the outer peripheral end portion toward a center of the plastic lens. In order to finish a surface roughness from the outer peripheral end portion to the outermost grating efficiently, a gap angle formed between the side cutting edge of the cutting tool and a cross-sectional surface vertical to an axis of rotation needs to be reduced to set a feeding speed as fast as possible. However, if the gap angle is smaller than the inclination of the diffraction surface of the outermost grating, the cutting tool (an opposite side to the distal end of a tool of the side cutting edge) interferes with the diffraction surface of the outermost grating. In order to avoid this interference, increasing the gap angle and lowering the feeding speed of the cutting tool are conceivable. However, since a processing efficiency is lowered and the gap angle is increased so that a crushing effect of the cutting surface by the side cutting edge (hereinafter, referred to as a burnishing effect) is also lowered, there is a case where the surface roughness is deteriorated.

If the outermost grating has a shape failure due to the interference with the tool, an optical performance of the processed plastic lens may be lowered. If there is the shape failure of the outermost grating and the surface roughness from the outer peripheral end portion to the outermost grating is deteriorated, an appearance quality of the optical member is varied so that the appearance quality may be lowered.

This disclosure provides a method of manufacturing a member having a desired projecting grating, an optical member, and an optical element.

SUMMARY OF THE INVENTION

This disclosure provides a method of manufacturing a member by rotating an object to be processed and processing a concentric surface while moving a cutting tool from an outer peripheral end portion of the object to be processed toward a center of rotation, including: a first step of moving the cutting tool so that a gap angle formed between a feeding direction and a side cutting edge of the cutting tool has a constant angle $\alpha_1$ to process a surface having an angle of inclination $\theta_0$; a second step of moving the cutting tool so that the gap angle becomes a constant angle $\alpha_2$ to process a surface having an angle of inclination $\theta$ after the first step; and a third step of moving the cutting tool so that the gap angle becomes a constant angle $\alpha_3$ to process a surface having an largest angle of inclination $\phi$ after the second process, wherein the gap angles $\alpha_1$, $\alpha_2$, and $\alpha_3$ are larger than 0 degree and not larger than 4 degrees, the angles of inclination $\theta_0$, $\theta$, and $\phi$ have a relationship of $\theta_0 < \theta < \phi$, and the angle of inclination $\theta$ is smaller than the angle $\alpha_1$.

The optical member of this disclosure is an optical member having a concentric diffraction surface facing the outward, wherein the projection having a inclined surface concentric to the diffraction surface having an angle of inclination $\theta$ smaller than the angle of inclination $\phi$ is provided outside the diffraction surface having the largest angle of inclination $\phi$.

The optical element of this disclosure is molded by a member manufactured by the above-described method of manufacturing a member.

The optical element of this disclosure includes a member obtained by molding the member manufactured by the above-described method of manufacturing the member, and a member molded by pouring a resin in the member.

Further features of the present invention will become apparent from the following description of exemplary embodiments with reference to the attached drawings.

DESCRIPTION OF THE EMBODIMENTS

First Embodiment

A first embodiment, which is an example of a method of manufacturing a member of this disclosure will be described with reference to the drawings.

Figure 2A:
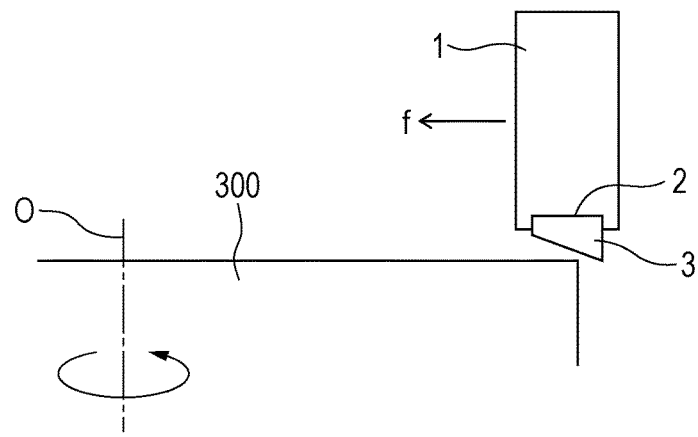
FIG. 2A is a schematic drawing of a flat surface cutting process.

FIG. 2A is a schematic drawing of a flat surface cutting process. Reference numeral 300 denotes an object to be processed, reference numeral 1 denotes a cutting tool, reference numeral 2 denotes a tool tip, reference numeral 3 denotes a tool tooth face, and reference sign f denotes a feeding direction of the cutting tool. First of all, the disc-shaped object to be processed 300 is mounted on a rotated principal axis of an ultraprecision processing machine, which is not illustrated. The cutting tool 1 processes a projecting grating on a surface of the object to be processed 300 while being moved from an outer peripheral end portion of the object to be processed 300 to a center of rotation thereof with respect to the objet to be processed 300 rotating about an optical axis at a high speed to manufacture an optical member. A direction perpendicular to a paper plane is defined as a cutting direction, and a left-and-right direction of the paper plane is defined as a feeding direction.

Conceivable examples of the member include a glass lens, a plastic lens, a composite lens having a plastic layer on a glass surface, and a lens molding die provided with a metal plating of Ni system and Cu system on a surface of an SUS system base material.

Preferable examples of the material of the tool tip 2 include high-hardness materials such as diamond or cBN and, specifically, monocrystal diamond is preferable as the material of the tool tip 2 because a very sharp cutting ridge line can be formed.

Figure 1A:
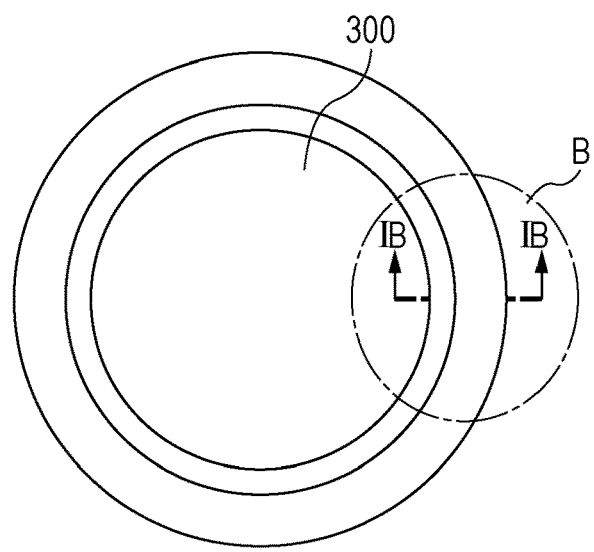
FIGS. 1A and 1B are schematic drawings of a method of manufacturing a member of this disclosure.
Figure 1B:
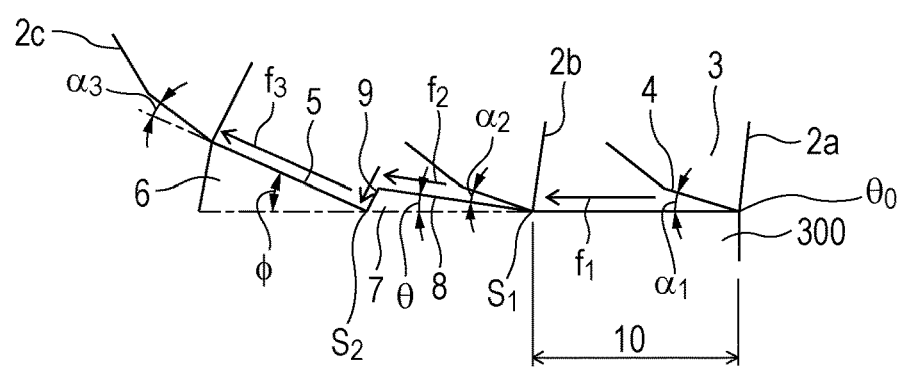
Figure 3A:
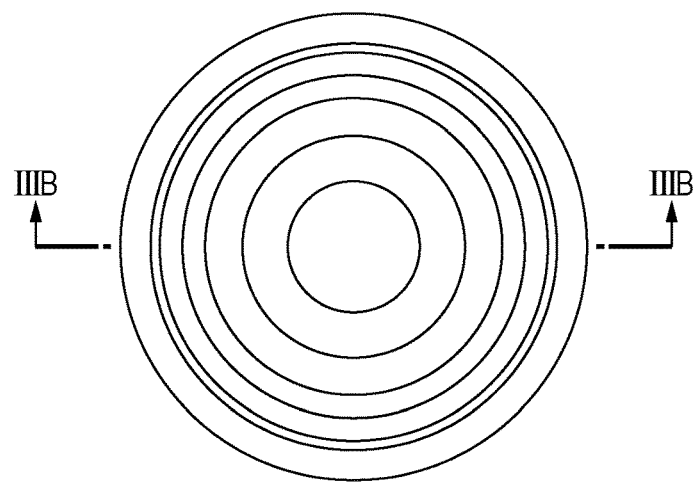
FIGS. 3A to 3C are examples of an optical member having a diffraction grating of this disclosure.
Figure 3B:
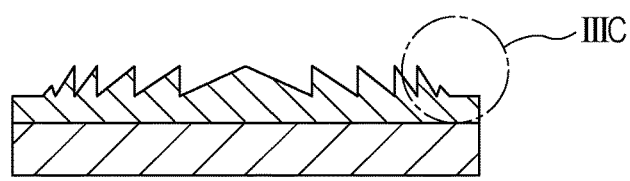

FIGS. 1A and 1B are drawings for explaining a processing surface during a processing of object to be processed 300 described in FIG. 2A, and movement of a tool when processing the processing surface thereof. FIG. 1A is a top view of the object to be processed 300 in the course of processing. FIG. 1B is a drawing illustrating a cross section of an area B taken along the line IB-IB in FIG. 1A and a movement of the tool. Specifically, for example, FIG. 1A illustrates a state in which the process is proceeded half-way through the optical member illustrated in FIG. 3 described later. In other words, when the process is completed, the optical member as illustrated in FIG. 3 is manufactured. FIG. 1B is a drawing corresponding to a cross-section of a part IIIC of the optical member illustrated in FIG. 3A to 3B.

Reference numeral 6 denotes an outermost diffraction grating, and reference numeral 5 denotes an outermost diffraction surface. The grating 6 and the surface 5 are formed into a concentric shape. Reference sign $\phi$ denotes an angle of inclination of the surface 5 (an angle formed between the surface 5 and a surface perpendicular to the optical axis), and has the largest angle of inclination in comparison with a surface which becomes the diffraction surface inside (the left side of the paper plane) of the surface 5, which is to be processed after the surface 5. Hereinafter, the surface 5 having the largest angle of inclination is referred to as "largest inclination surface".

Reference numeral 10 denotes an outer peripheral surface, and an angle of inclination $\theta_0$ (an angle formed between the outer peripheral surface and a surface perpendicular to an optical axis) is preferably 0 degree. However, if a relationship described later, $\phi>\theta>\theta_0$ is satisfied, the angle is not limited to 0 degree. The case where the angle of inclination $\theta_0$ is 0 degree is referred to as a flat surface here.

Reference numeral 8 denotes an inclined surface of a projection 7 formed adjacently to the grating 6 having the largest inclination surface 5. The angle of inclination $\theta$ of an inclined surface 8 (an angle formed between the inclined surface 8 and a surface perpendicular to the optical axis) is smaller than an angle of inclination $\phi$ of the largest inclination surface 5 adjacent thereto with a vertical wall (connecting surface) 9 interposed therebetween. In the related art, at least a portion adjacent to the outside of the largest inclination surface 5 of the outer peripheral surface 10 is a flat surface. However, this disclosure is characterized in that the projection 7 including the inclined surface having an angle of inclination smaller than the angle of inclination $\phi$ of the largest inclination surface 5 between the outer surface 10 and the largest inclination surface 5. In other words, the projection 7 having an inclined surface at an angle of inclination $\theta$ which satisfying a relationship of $\phi>\theta>\theta_0$ is formed between the outer peripheral surface 10 at the angle of inclination $\theta_0$ and the largest inclination surface 5 having an angle of inclination $\phi$. Accordingly, an interference of the tool with respect to the largest inclination diffraction surface 5 may be prevented. In this embodiment, the case where the outer peripheral surface 10 extends to the outer peripheral end portion of the object to be processed is illustrated. However, the effects of this disclosure is achieved as long as at least the portion which is in no danger of interference of the cutting tool adjacent to the projection 7 is the outer peripheral surface 10. No problem occurs even if either the projection-shaped portion, the depressed-shaped portion, or the inclined surface is formed on an outer peripheral portion of the outer peripheral surface 10 which is in no danger of interference of the cutting tool.

A method of manufacturing the outer peripheral surface, the inclined surface, and the largest inclination surface will be described.

First Step

An outer peripheral surface 10 is processed first. The process of the outer peripheral surface 10 is referred to as a first step here.

Reference numeral 2a denotes an inclination of a tool tip distal end portion in the first step in which the process of cutting the outer peripheral surface 10 is performed. Reference numeral 3 denotes a tool tooth face, and reference numeral 4 denotes a side cutting edge of the cutting tool. At the distal end portion of the tool tip 2 has two or more cutting edges in a tool feeding direction, and the cutting edge closest to the distal end of the tool. A length of the side cutting edge 4 is shorter than a length of the largest inclination surface 5.

For setting process conditions, if a surface roughness exceeds PV 20 nm, the optical performance may easily be generated, and hence a required surface roughness is not higher than PV 20 nm. If variations in the surface roughness exceeds ±5 nm, lowering of the appearance quality may occur very often. Therefore, the process condition needs to be set on the basis of the above-described two points. The following expression is an expression for obtaining a logical surface roughness h in the cutting process using a blade tip shaped cutting tool, where P is a distance that the tool proceeds in the feeding direction while the object to be processed makes one turn (hereinafter, referred to as a feed pitch of the tool), and α is a gap angle. The following expression is used to set the logical surface roughness from the feed pitch P of the tool and the gap angle α, $$h = P \times \tan \alpha.$$

The first step is the processing of the outer peripheral surface 10. The tool tip distal end portion 2a cuts into an object to be processed 300 from the outer peripheral end portion of the object to be processed 300 rotating at a high speed. The cutting process is continued to a lowermost point $S_1$ of the inclined surface 8 of the projection 7 so that the gap angle formed between the tool feeding direction (direction of travel) $f_1$ and the side cutting edge 4 in the process of the outer peripheral surface 10, and the gap angle becomes a certain angle $\alpha_1$. The logical surface roughness in the cutting process is geometrically determined by the gap angle and a tool feeding speed. However, in order to finish the surface roughness of the outer peripheral surface 10 efficiently, it is desirable to set the tool feeding speed to a value as fast as possible after the gap angle $\alpha_1$ has set as small angle as possible.

In the case where the object to be processed 300 is a glass lens, the cutting thickness achieved by the side cutting edge 4 may be reduced to a sub-micron level which allows ductile mode cutting by reducing the gap angle $\alpha_1$. Conceivable examples of the member include manufacturing a plastic lens, a composite lens having a plastic layer on the glass surface, and a lens molding die provided with a metal plating of Ni system and Cu system on the surface of the SUS system base material as the member. In this case, a burnishing effect in the side cutting edge 4 can be easily achieved by reducing the gap angle $\alpha_1$. Therefore, reducing the gap angle $\alpha_1$ is important for performing the cutting process for cutting various materials to be cut in a stable manner in addition to the reasons in terms of the processing efficiency. Specifically, the gap angle $\alpha_1$ is an angle which satisfies a relationship of 0 degree<$\alpha_1$<4 degrees, and is set to an angle larger than the inclination θ of the inclined surface 8 so as not to hit the inclined surface 8 in the next step.

Second Step

Consecutively after the process of the outer peripheral surface 10, the inclined surface 8 is processed. The process of the inclined surface 8 is referred to as a second step here. Reference sign 2b denotes an inclination of a tool tip distal end portion in the second step in which the process of cutting the inclined surface 8 is performed. The inclination θ of the inclined surface 8 is set arbitrarily as long as being an inclination smaller than the gap angle $\alpha_1$ of the tool when processing the outer peripheral surface 10. The cutting tool is moved so that the gap angle formed between a tool feeding direction $f_2$ and the side cutting edge 4 becomes a constant angle $\alpha_2$ from a lower side to an upper side of the inclined surface 8 having an angle θ smaller than the gap angle $\alpha_1$ to perform the cutting process. A cutting thickness by the side cutting edge 4 may be reduced efficiently to a sub-micron level which allows a ductile mode cutting and the burnishing effect of the side cutting edge 4 is obtained easily by reducing the gap angle $\alpha_2$ like the gap angle $\alpha_1$. Therefore, reducing the gap angle $\alpha_2$ is important for performing the cutting process for cutting various materials to be cut in a stable manner. Specifically, the gap angle $\alpha_2$ is set to 0 degree<$\alpha_2$≤4 degrees. In other words, the gap angle $\alpha_2$ is preferable larger than 0 degree and not larger than 4 degrees. The inclination θ of the inclined surface 8 is set to be smaller than the gap angle $\alpha_1$ in the first step, so that an opposite side to the distal end of the tool of the side cutting edge 4 does not interfere with the inclined surface 8, and the gap angle $\alpha_2$ is smaller than the gap angle $\alpha_1$ by θ at the lowermost point of the inclined surface 8. Therefore, a process of various objects to be cut is achieved in a more stable manner than the first step. If the feeding speed of the second step and the feeding speed of the first step are the same, the surface roughness is improved more. However, if the logical roughness between the outer peripheral surface 10 and the inclined surface 8 are different, the variations are required to fall within a range of ±5 nm. If the surface roughness between the outer peripheral surface 10 and the inclined surface 8 needs to be the same, the cutting tool is rotated clockwise about the axis of rotation perpendicular to the paper plane by θ to set the gap angle $\alpha_2$ and the gap angle $\alpha_1$ to the same angle, and then the process of the inclined surface 8 is performed at the same feeding speed. The surface roughness of the outer peripheral surface 10 may be set to that of the inclined surface 8 by increasing the feeding speed in the second step.

Third Process

After the process of the inclined surface 8, a vertical wall 9 which connects the inclined surface 8 with a lowermost point $S_3$ of the largest inclination surface 5 is processed, and consecutively, the largest inclination surface 5 is processed. The process of the largest inclination surface 5 located outermost among a number of surfaces which form the diffraction surface and having a largest angle of inclination is referred to as a third step here. Reference numeral 2c denotes an inclination of a tool tip distal end portion in the third step in which the process of cutting the largest inclination surface 5 is performed.

The cutting tool is moved so that the gap angle formed between a tool feeding direction $f_3$ and the side cutting edge 4 becomes a constant angle $\alpha_3$ from a lower side to a higher side of the largest inclination surface 5 to perform the cutting process. The cutting thickness by the side cutting edge 4 may be reduced efficiently to a sub-micron level which allows the ductile mode cutting and the burnishing effect of the side cutting edge 4 is obtained easily by reducing the gap angle $\alpha_3$ like the gap angle $\alpha_1$ and the gap angle $\alpha_2$. Therefore, reducing the gap angle $\alpha_3$ is important for performing the cutting process for cutting various materials to be cut in a stable manner in addition to the reason in terms of the process efficiency. Specifically, the gap angle $\alpha_3$ is set to 0 degree<$\alpha_3$≤4 degrees. In other words, the gap angle $\alpha_3$ is preferable larger than 0 degree and not larger than 4 degrees. At this time, the gap angle $\alpha_3$ and the tool feeding speed are preferably set to the same as the first step and the second step, or to the comparative level to perform the process. Accordingly, the surface roughness of the outer peripheral surface 10, the inclined surface 8, and the largest inclination surface 5 become the same or the comparative level, so that variations in appearance quality of the member depending on portions are avoided, and improvement of the appearance quality is expected. The cutting tool is rotated clockwise about the axis of rotation perpendicular to the paper plane before processing the vertical wall 9 which connects the highermost point of the inclined surface 8 and the lower point of the largest inclination surface 5 so that the gap angle $\alpha_3$ becomes the same as or the comparative level to the gap angle $\alpha_1$ and the gap angle $\alpha_2$ at the lowermost point of the largest inclination surface 5. Accordingly, interference of the side cutting edge 4 on the side opposite to the distal end of the tool with the largest inclination surface 5 when the vertical wall 9 is processed with the tool tip distal end portion 2b at the posture in the second step depending on the magnitude of an inclination φ of the largest inclination surface 5 is prevented.

Figure 2B:
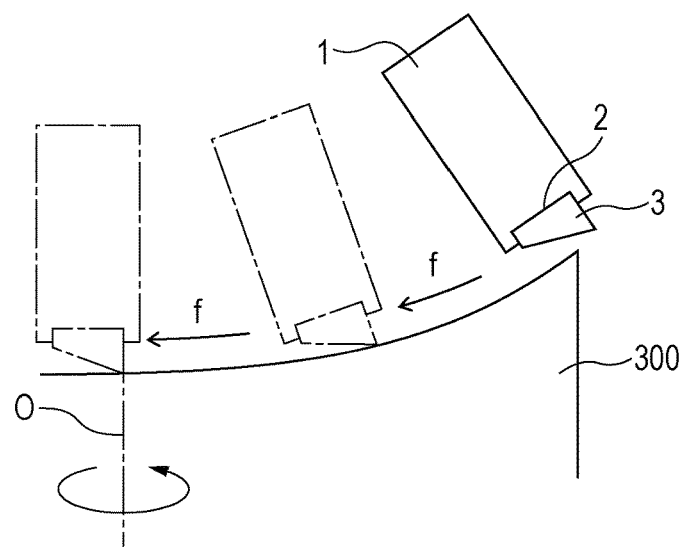
FIG. 2B is a schematic drawing of a cutting process for cutting a diffraction optical element forming die.

In the above-described embodiment, a method of manufacturing an optical member having a flat base (a surface connecting lowermost points of a number of the diffraction surfaces is a flat surface) has been exemplified. However, even an optical member having a depressed curved base as illustrated in FIG. 2B (a surface connecting the lowermost points of a number of the diffraction surfaces is a depressed surface), it is apparent that this disclosure may be applied by setting the tool feeding direction to a direction of tangent line of the shape to be processed. Even an optical member having a projecting curved base, it is apparent that this disclosure may be applied by setting the tool feeding direction to the direction of tangent line of the shape to be processed.

A member molded by pouring a resin to a member manufactured by the method of manufacturing the member described in this embodiment may also be used as the optical element.

In addition, the member molded by pouring the resin to the member manufactured by the method of manufacturing the member described in the first embodiment and a member molded by further pouring the resin into the above-described molded member may also be used as an optical element.

Second Embodiment

An example of the optical member of this disclosure will be described with reference to the drawings.

Figure 3C:
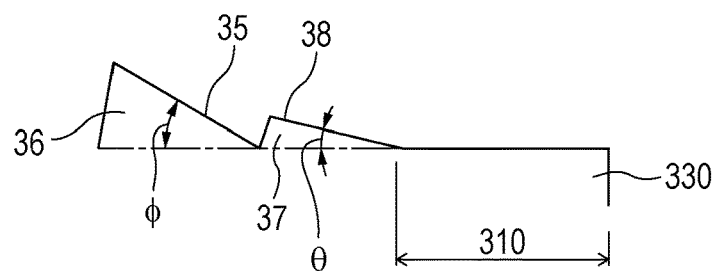

FIGS. 3A to 3C are drawings illustrating an example of the optical member of this disclosure. FIG. 3A is a top view and FIG. 3B is a cross-sectional view taken along the line IIIB-IIIB in FIG. 3A. FIG. 3C is an enlarged drawing of a portion IIIC in FIG. 3B. Reference numeral 35 denotes a largest inclination diffraction surface, reference numeral 36 denotes a diffraction grating having the largest inclination diffraction surface 35. The diffraction grating is formed into a concentric shape. In FIGS. 3A to 3C, the number of the illustrated diffraction gratings is smaller than the actual number for the sake of simplification. However, a large number of the diffraction gratings may be provided. Reference numeral 37 denotes a projection having a triangular cross-sectional shape obtained by cutting along a plane passing through an optical axis and being parallel to the optical axis, which is adjacent to the outside of the diffraction grating having the largest inclination diffraction surface 35. Reference numeral 38 denotes an inclined surface having an angle of inclination smaller than the largest inclination diffraction surface 35, reference numeral 310 denotes an outer peripheral surface on the outside of the projection 37, and reference numeral 330 denotes an optical member. Conceivable examples of the optical member of this disclosure include a glass lens, a plastic lens, a composite lens having a plastic layer on the glass surface, and a lens molding die provided with a metal plating of Ni system and Cu system on the surface of the SUS system base material. An optical member molded by further transferring the member molded by transferring the lens molding die is also included.

Reference sign φ denotes an inclination (angle of inclination) of the largest inclination diffraction surface 35, and is an angle formed between the diffraction surface 35 and a plane perpendicular to the optical axis. Reference sign θ is an inclination (angle of inclination) of the inclined surface 38 (an angle formed between the inclined surface 38 and the plane perpendicular to the optical axis). Reference sign $\theta_0$ (not illustrated) denotes an inclination of the outer peripheral surface (an angle formed between the outer peripheral surface 310 and the plane perpendicular to the optical axis), and is smaller than θ, and $\theta_0$ (not illustrated) may be 0 degree.

The embodiment is characterized in that the projection 37 having the inclined surface 38 having an angle of inclination θ smaller than the angle of inclination φ of the largest inclination diffraction surface 35 is provided on the outside of and adjacent to the diffraction grating 36 having the largest inclination diffraction surface 35. An example in which the cross-sectional shape of the projection (the cross-sectional shape taken along a plane passing through, and being parallel to, the optical axis) is a triangular shape in this embodiment has been described. However, the invention is not limited thereto.

FIGS. 4A to 4D illustrate other examples of the optical member having the diffraction grating of this disclosure. For the sake of simplification, a cross-sectional shape of part of the optical member will be illustrated. The same portions as FIGS. 3A to 3C are denoted by the same reference numerals, and description thereof is omitted.

Figure 4A:
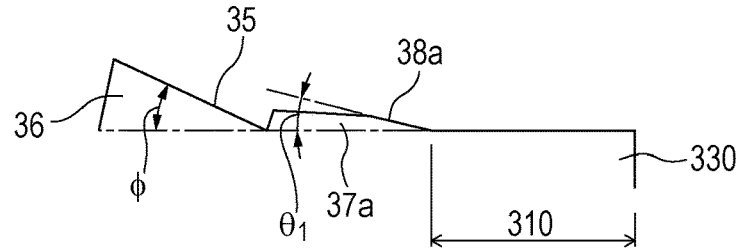
FIGS. 4A to 4D illustrate other examples of the optical member having the diffraction grating of this disclosure.

In FIG. 4A, an example in which reference numeral 37a denotes a cross-sectional shape of the projection (the cross-sectional shape taken along a plane passing through, and being parallel to, the optical axis) being a square shape. Reference numeral 38a denotes an inclined surface of the projection 37a connected to the outer peripheral surface 310, and reference sign $\theta_1$ denotes an inclination of the inclined surface 38a.

Figure 4B:
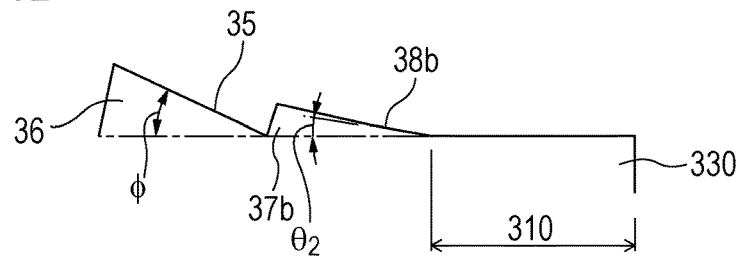

In FIG. 4B, an example in which reference numeral 37b denotes a cross-sectional shape of the projection (the cross-sectional shape taken along a plane passing through, and being parallel to, the optical axis) being a square shape. Reference numerals $38b_1$ and $38b_2$ are inclined surfaces of the projection 37b having different angles of inclination. Reference numeral 38b1 denotes an inclined surface connected to the outer peripheral surface 310, and $\theta_2$ denotes an angle of inclination of the inclined surface $38b_1$.

Figure 4C:
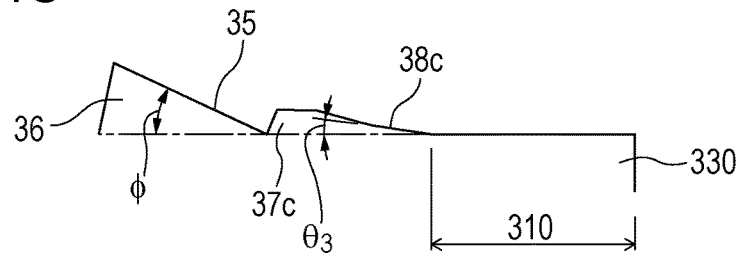

In FIG. 4C, an example in which reference numeral 37d denotes a cross-sectional shape of the projection (the cross-sectional shape taken along a plane passing through, and being parallel to, the optical axis) being a pentagonal shape. Reference numerals $38c_1$, $38c_2$, and $38c_3$ are inclined surfaces of the projection 37c having different angles of inclination. Reference numeral $38c_1$ denotes an inclined surface connected to the outer peripheral surface 310, and $\theta_3$ denotes an angle of inclination of the inclined surface $38c_1$.

Figure 4D:
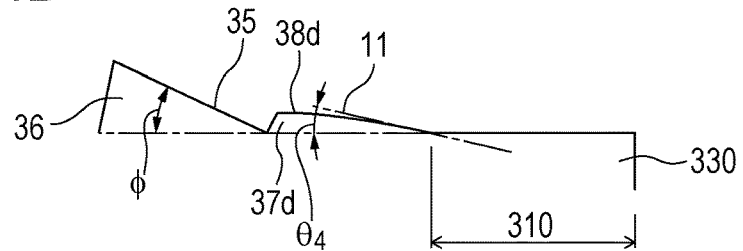

In FIG. 4D, an example in which reference numeral 37d denotes a cross-sectional shape of the projection (the cross-sectional shape taken along a plane passing through, and being parallel to, the optical axis) being partly a inclined pentagonal shape. Reference numeral 38d denotes a curved surface connected to the outer peripheral surface 310. Reference numeral 311 denotes a tangent line at the lowermost point of the curved surface 38d, and $\theta_4$ denotes an inclination of the tangent line 311.

As illustrated in FIGS. 4A to 4C, in the case where the projection has a polygonal shape, if inclinations ($\theta_1$, $\theta_2$, and $\theta_3$) of the inclined surfaces ($38a$, $38b_1$, and $38c_1$) connected to the peripheral surface 310 are smaller than the inclination φ of the largest inclination diffraction surface 35, the object of this disclosure is achieved. Furthermore, the inclination of the inclined surface located between the inclined surfaces (38*a*, 38*b*₁, and 38*c*₁) connected to an outer peripheral portion 310 and the highermost points of the projections (37*a*, 37*b*, and 37*c*) are preferably smaller than the inclination $\phi$ of the largest inclination diffraction surface 35 as well.

As illustrated in FIG. 4D, in the case where the projection has a projecting curved surface 38*d* connected to the outer peripheral surface 310, if the inclination of a tangent line $\theta_4$ at the lowermost point of the curved surface 38*d* is smaller than the inclination $\phi$ of the largest inclination diffraction surface 35, the object of this disclosure is achieved. The curved surface 38*d* may be a depressed curved surface, or a curved surface including depressions and projections mixed therein.

The optical member of the second embodiment is manufactured by the method of manufacturing a member described in the first embodiment. In addition, the optical member of the second embodiment may be the member molded by further pouring the resin in the member molded by pouring the resin in the member manufactured by the method of manufacturing the member described in the first embodiment.

EXAMPLES

Subsequently, examples of this disclosure will be described.

Example 1

In Example 1, an example in which a diffraction optical element forming die having a projecting grating in a depressed base shape is manufactured by a method of manufacturing the member illustrated in the first embodiment will be described with Comparative Examples.

FIG. 2B is a schematic drawing of a cutting process for cutting the diffraction optical element forming die. As the object to be processed 300, a member plated with a NiP on the surface of a SUS system base material having a depressed base shape was used. A mono-crystal diamond was used as a tool tip 2. The object to be processed 300 was mounted on a rotated principal axis of an ultraprecision processing machine, which was not illustrated. The cutting tool 1 was mounted on the ultraprecision processing machine, which was not illustrated, so that the movement along the orthogonal double axes existing in parallel to a tooth face 3, and the rotation about the axis of rotation perpendicular to the tooth face 3 were enabled. Subsequently, the object to be processed 300 was rotated at a high speed, and a projecting grating was formed by processing the surface of the object to be processed 300 while feeding the cutting tool 1 from the outside toward the center of the object to be processed 300, thereby having manufactured a member (metal die).

At this time, as illustrated by a solid line and a double-dashed chain line in FIG. 2B, the cutting tool 1 was rotated about the axis of rotation as needed by using the axis of rotation while being fed in the feeding direction f of the tool following the intended processed shape. Accordingly, the cutting tool 1 is capable of maintaining a certain inclination with respect to the feeding direction f of the tool from a start to an end of process. In all the processes illustrated in Example 1 and Example 2 described later, the tool posture control, described above was used.

A result of process will be shown in Table 1. Results of the process are illustrated in Table 1

TABLE 1

| | largest inclination diffraction surface | | | projection | | | outer peripheral surface | | result of process |
|---|---|---|---|---|---|---|---|---|---|
| | $\phi$ | $\alpha_3$ | $P_3$ | $\theta$ | $\alpha_2$ | $P_2$ | $\alpha_1$ | $P_1$ | |
| Example 1 | 5 | 3.5 | 250 nm | 0.5 | 3.5 | 250 nm | 4 | 200 nm | ○ |
| Comparative Example 1 | 5 | 3.5 | 250 nm | — | — | — | 8.5 | 100 nm | x |
| Comparative Example 2 | 5 | 3.5 | 250 nm | — | — | — | 4 ↓ 8.5 | 200 nm ↓ 100 nm | x |

In Table 1, $\phi$ is an inclination of the largest inclination surface 5, $\theta$ is an inclination of the inclined surface of the projection 7. $\alpha_1$ is a gap angle in the process of the outer peripheral surface 10, $\alpha_2$ is a gap angle in the process of the inclined surface 8 of the projection 7, and $\alpha_3$ is a gap angle in the process of the largest inclination surface 5. $P_1$ is a distance that the tool proceeds in the feeding direction during one turn of the object to be processed on the outer peripheral surface (hereinafter, referred to as a feed pitch of the tool), $P_2$ is a feed pitch of the tool on the inclined surface 8 of the projection, and $P_3$ is a feed pitch of the tool on the largest inclination surface 5.

The contents of the respective processes will be described below.

First of all, Example 1 will be described with reference to FIGS. 1A and 1B. This example was implemented on the depressed base. However, for the sake of simplification, description will be given with reference to FIGS. 1A and 1B, having the flat base shape. In the diffraction optical element forming die which is to be processed this time, since the inclination $\phi$ of the largest inclination diffraction surface 5 was 5 degrees, the triangular projection 7 adjacent to the outside of the largest inclination diffraction grating 6 and various processing conditions were set in detail.

For setting process conditions, if a surface roughness specifically for forming the diffraction surface (for example, the largest inclination surface 5) exceeds PV 20 nm, lowering of the optical performance may easily occur, and hence a required surface roughness is not higher than PV 20 nm. If variations in the surface roughness of a portion other than the vertical wall 9 exceeds ±5 nm, lowering of the appearance quality may occur very often. Therefore, the process condition was set on the basis of the above-described two points. The following expression is an expression for obtaining a logical surface roughness h in the cutting process using a blade tip shaped cutting tool, where P is a feed pitch of the tool, and a is a gap angle. The following expression was used to set the feed pitch P of the tool and the gap angle α of the tool so that the logical surface roughness becomes a value on the order of PV 15 nm.

$$h = P \times \tan \alpha.$$

In Example, 1, after the tool tip distal end 2*a* has reached the lowermost point of the inclined surface 8 of the projection 7 while maintaining the gap angle $\alpha_1$ constant, and the inclined surface 8 was processed while maintaining the gap angle 2 constant and the largest inclination surface 5 was processed while maintaining the gap angle $\alpha_3$ constant in this order.

At this time, the number of rotation of an optical member 30 was set to 3000 min−1, and in the process of the outer peripheral surface 10, the gap angle $\alpha_1$ was set to 4 degrees at which the burnishing effect is expected, and the tool feeding speed was set to 0.6 mm/min($P_1$=200 nm). The inclination θ of the inclined surface 8 of the projection 7 was set to 0.5 degrees, the gap angle $\alpha_2$ during the process of the inclined surface 8 and the gap angle $\alpha_3$ during the process of the largest inclination surface 5 was set to 3.5 degrees, and the tool feeding speed in the process of the inclined surface 8 and the largest inclination surface 5 was set to 0.75 mm/min ($P_2$=$P_3$=250 nm). An edge width of the used side cutting edge 4 of the cutting tool was set to 3 μm, and an angle of the edge of the distal end of the tool was set to 80 degrees. In Comparative Example 1 and Comparative Example 2 described later as well, the logical surface roughness other than the vertical wall 9, the inclination φ of the largest inclination surface 5, the number of rotations of the optical member 30, the edge width of the side cutting edge 4, and the edge angle of the distal end of the tool are common.

Figure 5A:
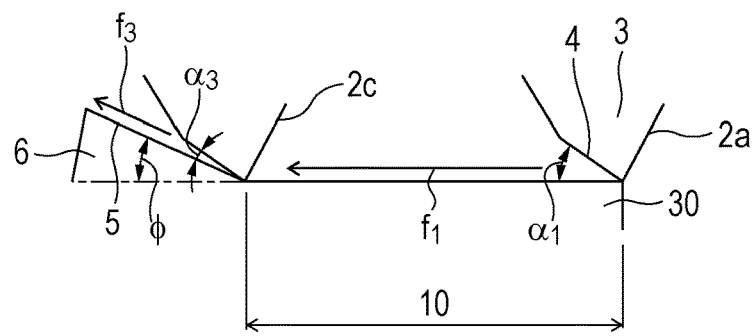
FIG. 5A is a schematic drawing of a method of manufacturing in Comparative Example 1.

Subsequently, Comparative Example 1 will be described with reference to FIG. 5A. Although Comparative Example 1 was implemented in the depression surface base in the same manner as Example 1, FIG. 5A illustrates a flat base shape for the sake of simplification. In Comparative Example 1, after the tool tip distal end 2a has reached the lowermost point of the largest inclination surface 5 while maintaining the gap angle $\alpha_1$ constant, and the largest inclination surface 5 was processed while maintaining the gap angle $\alpha_3$ constant.

At this time, the gap angle $\alpha_1$ during the process of the outer peripheral surface 10 was set to 8.5 degrees, and the tool feeding speed was set to 0.3 mm/min ($P_1$=100 nm). The gap angle $\alpha_3$ during the process of the largest inclination surface 5 was set to 3.5 degrees, and the tool feeding speed was set to 0.75 mm/min ($P_3$=250 nm).

Figure 5B:
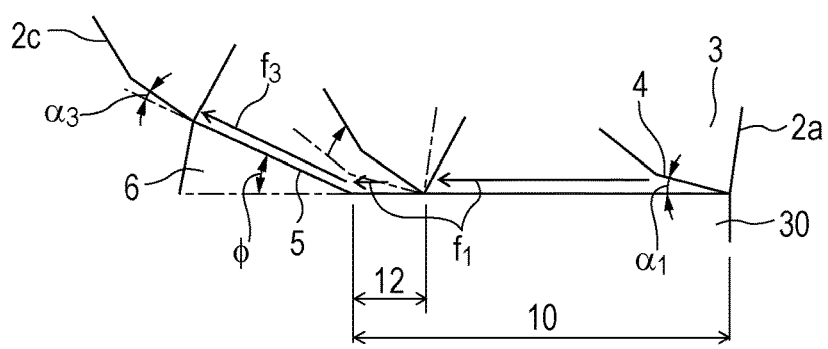
FIG. 5B is a schematic drawing of a method of manufacturing in Comparative Example 2.

Subsequently, Comparative Example 2 will be described with reference to FIG. 5B. Although comparative Example 2 was also implemented in the depression surface base in the same manner as Example 1, FIG. 5B illustrates a flat base shape for the sake of simplification. In Comparative Example 2, the tool tip distal end 2a proceeded the process toward the lowermost point of the largest inclination surface 5 while maintaining the gap angle $\alpha_1$ smaller than the inclination φ of the largest inclination surface 5. However, if the tool tip distal end 2a reaches the lowermost point of the largest inclination surface 5 as-is, the side cutting edge 4 on the opposite side to the distal end of the tool interfere with the largest inclination surface 5. Therefore, in a left area 12 of the outer peripheral surface 10, the process is proceeded to the lowermost point of the largest inclination surface 5 while rotating the cutting tool about the axis of rotation perpendicular to the paper plane. Subsequently, the largest inclination surface 5 was processed while maintaining the gap angle $\alpha_3$ constant.

At this time, in the process of the outer peripheral surface 10, the gap angle $\alpha_1$ was set to 4 degrees at which the burnishing effect is expected, and the tool feeding speed was set to 0.6 mm/min ($P_1$=200 nm), and the gap angle $\alpha_1$ was increased gradually in the left area 12 of the outer peripheral surface 10. The gap angle α1 was set to become 8.5 degrees when reaching the lowermost point of the largest inclination surface 5. The tool feeding speed in the left area 12 of the outer peripheral surface 10 is gradually reduced as the gap angle increases so that the logical surface roughness becomes a value on the order of PV 15 nm, and becomes 0.3 mm/min ($P_1$=100 nm) when reaching the lowermost point of the largest inclination surface 5. The gap angle $\alpha_3$ during the process of the largest inclination surface 5 was set to 3.5 degrees, and the tool feeding speed was set to 0.75 mm/min ($P_3$=250 nm).

In the result of processing shown in Table 1, the cases where the surface roughness of the outer peripheral surface 10, the inclined surface 8 of the projection 7 (but not in Comparative Examples 1 and 2), and the largest inclination surface 5 were set to PV 20 nm or lower and variations in the surface roughness of the measured portions was ±5 nm or smaller were marked with a circle. The cases where at least one of them was out of the above-described range were marked with a cross. The surface roughness was measured with an atomic force microscope (AFM).

Figure 7:
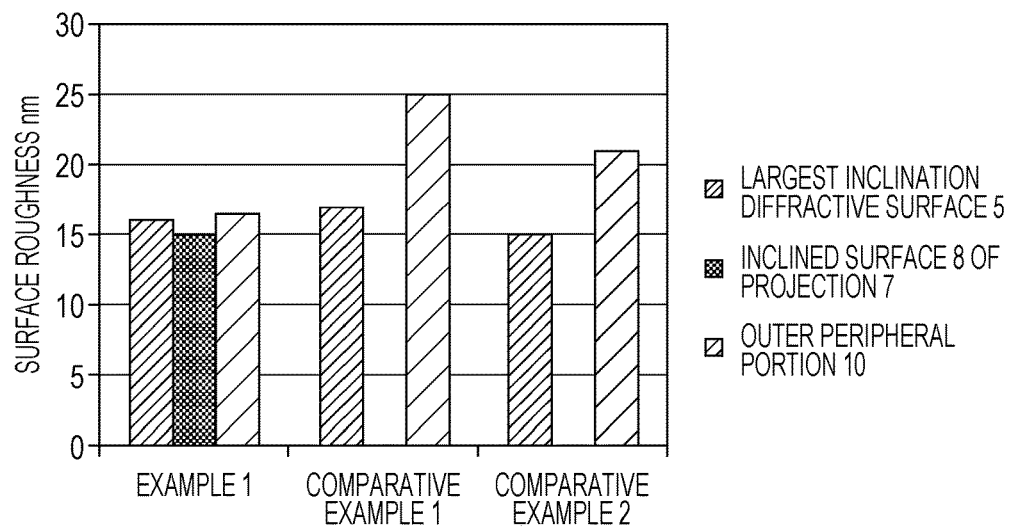
FIG. 7 is a graph illustrating a surface roughness in Example 1.

FIG. 7 illustrates the result of measurement of the surface roughness in Example 1, Comparative Example 1, and Comparative Example 2. In Example 1, the surface roughness at the three points at three points was not higher than PV 20 nm, and variation widths were not larger than ±5 nm. In contrast, in Comparative Example 1, the surface roughness of the largest inclination surface 5 was not higher than the PV 20 nm, but the surface roughness of the outer peripheral surface 10 exceeds PV 20 nm. In Comparative Example 2, the surface roughness of the largest inclination surface 5 was not higher than PV 20 nm, but the surface roughness of the left area 12 of the outer peripheral surface exceeds PV 20 nm. In Comparative Example 2, although the surface roughness of the outer peripheral surface 10 other than the left area 12 was on the order of PV 15 nm. However, in the left area 12, it seemed that the surface roughness was deteriorated by the influence of the reduction of the burnishing effect due to the gradual increase of the gap angle α1. From the result described above, it is confirmed that this disclosure is effective.

Example 2

Example 2 as another example of this disclosure will be described. In Example 2, a diffraction optical element forming die having a projecting grating in a depressed base shape is manufactured by a method of manufacturing the optical member having the diffraction grating illustrated in the first embodiment. Points of view regarding the metal mold used for the process, the tool tip material, tool posture control during the process, and the logical source roughness are common to Example 1.

A result of process will be described Table 2.

TABLE 2

| | largest inclination diffraction surface | | | projection | | | outer peripheral surface | | result of process |
|---|---|---|---|---|---|---|---|---|---|
| | φ | $\alpha_3$ | $P_3$ | θ | $\alpha_2$ | $P_2$ | $\alpha_1$ | 1 | |
| Example 2 | 5 | 4 | 250 nm | 3.9 | 4 | 200 | 4 | 200 nm | ○ |
| Comparative Example 3 | 5 | 5 | 170 nm | 4.9 | 5 | | 5 | 170 nm | x |

In Table 2, φ is an inclination of the largest inclination surface 5, θ is an inclination of the inclined surface of the projection 7. $\alpha_1$ is a gap angle in the process of the outer peripheral surface 10, $\alpha_2$ is a gap angle in the process of the inclined surface 8 of the projection 7, and $\alpha_3$ is a gap angle in the process of the largest inclination surface 5. $P_1$ is a feed pitch of the tool on the outer peripheral surface 10, $P_2$ is a feed pitch of the tool on the inclined surface 8 of the projection, and $P_3$ is a feed pitch of the tool on the largest inclination surface 5. The contents of the respective processes will be described below.

Figure 6:
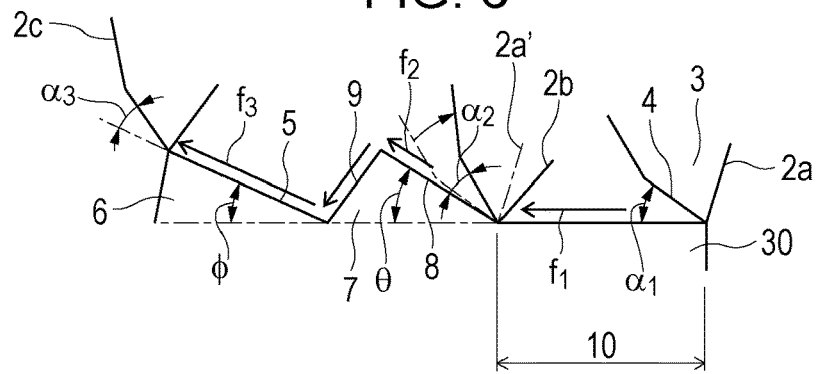
FIG. 6 is a schematic drawing of a common method of manufacturing in Example 2 and Comparative Example 3.

First of all, Example 2 and Comparative Example 3 will be described with reference to FIG. 6. Although Example 2 and Comparative Example 3 were implemented with the depressed base, FIG. 6 illustrates a flat base shape for the sake of simplification.

In any of the processes, the tool tip distal end 2*a* proceeded the process to the lowermost point of the inclined surface 8 of the projection 7 while maintaining the gap angle $\alpha_1$ constant, and then rotated the cutting tool about the axis of rotation perpendicularly to the paper plane from a posture of the tool tip 2*a*' illustrated by a double-dashed chin line to a posture of the tool tip 2*b*. Then, the process of the inclined surface 8 while maintaining the gap angle $\alpha_2$ constant and the process of the largest inclination surface 5 while maintaining the gap angle $\alpha_3$ constant were followed. At this time, the inclination $\phi$ of the largest inclination diffraction surface 5 was 5 degrees, the number of rotations of the optical member 30 was 3000 min$^{-1}$, the edge width of the side cutting edge 4 of the used cutting tool was 3 μm, and the edge angle of the distal end of the tool was 70 degrees. On the basis of the above-described expression, the feed pitch P of the tool and the gap angle $\alpha$ of the tool was set so that the logical surface roughness becomes a value on the order of PV 15 nm.

In Example 2, in the process of the outer peripheral surface 10, the gap angle $\alpha_1$ was set to 4 degrees at which the burnishing effect is expected, and the tool feeding speed was set to 0.6 mm/min ($P_1$=200 nm). The inclination $\theta$ of the inclined surface 8 of the projection 7 was set to 3.9 degrees, the gap angle $\alpha_2$ during the process of the inclined surface 8 and the gap angle $\alpha_3$ during the process of the largest inclination surface 5 was set to 4 degrees, and the tool feeding speed in the process of the inclined surface 8 and the largest inclination surface 5 was set to 0.6 mm/min ($P_2$=$P_3$=200 nm).

In Example 3, in the process of the outer peripheral surface 10, the gap angle $\alpha_1$ was set to 5 degrees, and the tool feeding speed was set to 0.51 mm/min ($P_1$=170 nm). The inclination $\theta$ of the inclined surface 8 of the projection 7 was set to 4.9 degrees, the gap angle $\alpha_2$ during the process of the inclined surface 8 and the gap angle $\alpha_3$ during the process of the largest inclination surface 5 was set to 5 degrees, and the tool feeding speed in the process of the inclined surface 8 and the largest inclination surface 5 was set to 0.51 mm/min ($P_2$=$P_3$=170 nm).

In the result of processing shown in Table 2, the cases where the surface roughness of the outer peripheral surface 10, the inclined surface 8 of the projection 7, and the largest inclination surface 5 was set to PV 20 nm or lower and variations in the surface roughness of the measured portions were ±5 nm or smaller were marked with a circle. In contrast, the cases where at least one of them was out of the above-described range were marked with a cross. The surface roughness was measured with an atomic force microscope (AFM).

Figure 8:
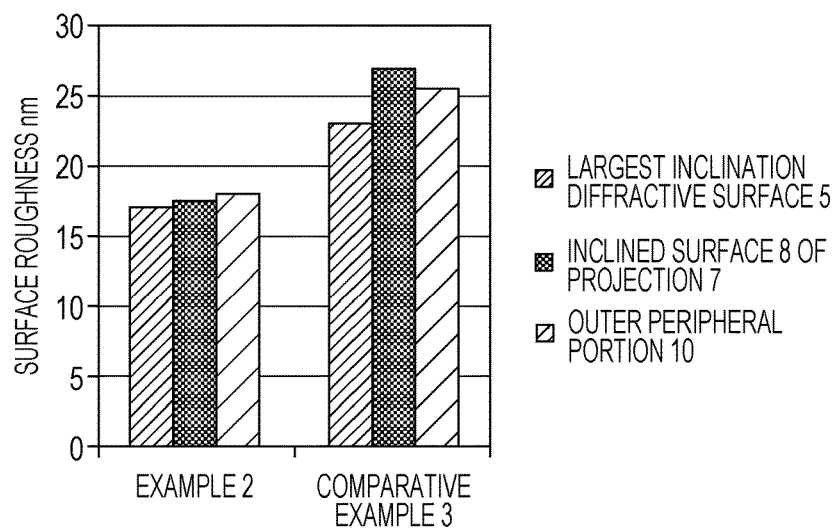
FIG. 8 is a graph illustrating a surface roughness in Example 2.

FIG. 8 illustrates the result of measurement of the surface roughness in Example 2, and Comparative Example 3. In Example 2, the surface roughness at the three points was not higher than PV 20 nm, and variation widths were not larger than ±5 nm. In contrast, in Comparative Example 3, the surface roughness at all the three points exceed PV 20 nm. In Comparative Example 3, it seemed that the surface roughness exceeded PV 20 nm because the inclination $\theta$ of the inclined surface 8 of the projection 7 was 4.9 degrees and the gap angle $\alpha_1$ was obliged to be set to a exceed 4.9 degrees during the process of the outer peripheral surface 10. Since the gap angle $\alpha_2$ and the gap angle $\alpha_3$ were determined so as to follow the gap angle $\alpha_1$, the surface roughness of the inclined surface 8 of the projection 7 and the largest inclination surface 5 results in the same manner. From the results described above, it was found that the inclination $\theta$ of the inclined surface 8 of the projection 7 set to $0<\theta\leq 4$ degrees was preferable.

The interference between the surface having a largest inclination and the cutting tool is avoided, and deterioration of the surface roughness of the outside of the surface having the largest inclination is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-186855 filed Sep. 12, 2014, which is hereby incorporated by reference herein in its entirety.

What is claimed is:

1. A method of manufacturing a member by rotating an object to be processed and processing a plurality of concentric projections while moving a cutting tool from an outer peripheral end portion of the object to be processed toward a center of rotation, the object having a flat surface at the outer peripheral end portion, comprising:

a first step of moving the cutting tool so that a gap angle formed between a feeding direction of the cutting tool and a side cutting edge of the cutting tool has a constant angle $\alpha_1$ to process the flat surface;

a second step of moving the cutting tool so that the gap angle becomes a constant angle $\alpha_2$ to process a projection that has a surface having an angle of inclination $\theta$ and being adjacent to the flat surface after the first step; and a third step of moving the cutting tool so that the gap angle becomes a constant angle $\alpha_3$ to process a projection that has a surface having a largest angle of inclination $\phi$ among the plurality of concentric projections, the projection having the surface having the largest angle of inclination $\phi$ being adjacent to the projection having the surface having the angle of inclination $\theta$, after the second step, wherein the gap angles $\alpha_1$, $\alpha_2$, and $\alpha_3$ are larger than 0 degree and not larger than 4 degrees, the angles of inclination $\theta$ and $\phi$ have a relationship of $0<\theta<\phi$, and the angle of inclination $\theta$ is smaller than the angle $\alpha_1$.

2. The method of manufacturing a member according to claim 1, wherein the gap angle $\alpha_1$, $\alpha_2$, and $\alpha_3$ are set to be the same angle.

3. The method of manufacturing a member according to claim 1, wherein the member includes one of a glass lens, a plastic lens, a composite lens having a plastic layer on a grass surface, and a lens molding die.

4. An optical element molded by a member manufactured by a method of manufacturing a member according to claim 1.

5. An optical element comprising:

a first part obtained by transferring the plurality of concentric projections of a member manufactured by the method of manufacturing a member according to claim 1 to a resin; and a second part obtained by pouring a resin on the first part.

6. An optical equipment comprising the optical element according to claim 5.

\* \* \* \* \*